US012744022B2

(12) United States Patent
Zhang et al.

(10) Patent No.: US 12,744,022 B2
(45) Date of Patent: Sep. 22, 2026

(54) SOUND-ABSORBING PARTICLE, PREPARATION METHOD THEREOF, AND SPEAKER

(71) Applicant: AAC Microtech (Changzhou) Co., Ltd., Changzhou City (CN)

(72) Inventors: Jie Zhang, Changzhou (CN); Hezhi Wang, Changzhou (CN); Chao Wang, Changzhou (CN); Zhongyang Wang, Changzhou (CN)

(73) Assignee: AAG Microtech (Changzhou) Co., Ltd., Changzhou City (CN)

( * ) Notice: Subject to any disclaimer, the term of this patent is extended or adjusted under 35 U.S.C. 154(b) by 119 days.

(21) Appl. No.: 18/988,748

(22) Filed: Dec. 19, 2024

(65) Prior Publication Data

US 2026/0051311 A1 Feb. 19, 2026

Related U.S. Application Data

(63) Continuation of application No. PCT/CN2024/113110, filed on Aug. 19, 2024.

(51) Int. Cl.

| | |
|---|---|
| ***G10K 11/165*** | (2006.01) |
| ***H04R 1/28*** | (2006.01) |
| ***H04R 1/32*** | (2006.01) |

(52) U.S. Cl.
CPC ........... *G10K 11/165* (2013.01); *H04R 1/323* (2013.01)

(58) Field of Classification Search
CPC .... G10K 11/165; H04R 1/323; H04R 1/2811; H04R 2201/029; H04R 2499/11; H04R 1/288
USPC ........................................ 381/354, 150, 337
See application file for complete search history.

(56) References Cited

U.S. PATENT DOCUMENTS

| | | | | |
|---|---|---|---|---|
| 2005/0286729 A1* | 12/2005 | Harwood | ................. | H04R 7/04 381/152 |
| 2017/0105070 A1* | 4/2017 | O'Polka | .................. | H04R 5/02 |

* cited by examiner

*Primary Examiner* — Thjuan K Addy
(74) *Attorney, Agent, or Firm* — Wiersch Law Group

(57) ABSTRACT

The present disclosure relates to a sound-absorbing particle, a preparation method thereof, and a speaker. The sound-absorbing particle is formed by combing a molecular sieve and an adhesive, and includes a first flat surface and a second flat surface symmetrically distributed to each other, and a arc-shaped side edge connecting the first flat surface and the second flat surface. A ratio of the molecular sieve and the adhesive by weight is 1:(0.02-0.1). The sound-absorbing particle according to the present disclosure has a smaller longitudinal size under the same volume, the path of gas entering the interior of the sound-absorbing particle is shorter, and more gas molecules can be adsorbed or desorbed in a short time, thus making the sound-absorbing particle has better sound-absorbing effect, and filling the rear cavity of the speaker with the sound-absorbing particles can significantly improve the acoustic performance of the speaker.

16 Claims, 4 Drawing Sheets

SOUND-ABSORBING PARTICLE, PREPARATION METHOD THEREOF, AND SPEAKER

TECHNICAL FIELD

The present disclosure relates to the field of acoustics and, in particular, to a sound-absorbing particle and a preparation method thereof, and a speaker.

BACKGROUND

With the increasing popularity of portable electronic devices such as smart phones and Bluetooth headsets, people's requirements for audio quality are also increasing. In order to improve the sound effect of the speaker, one of the common practices is to fill the rear cavity of the speaker with sound-absorbing materials to increase the virtual volume of the rear cavity, thereby improving the audio quality.

After the speaker is packaged, the effect of the volume of the empty cavity on the overall resonance frequency is manifested as the smaller the cavity, the higher the resonance frequency. Molecular sieve, as a multi-porous structure material, can continuously adsorb and desorb the air in the cavity when the empty cavity vibrates, thereby indirectly achieving the effect of increasing the volume of the cavity. Limited by the overall size of portable devices such as mobile phones, in order to achieve better low-frequency effect of the speaker, on the one hand, the resonance frequency of the speaker is required to be as low as possible, and on the other hand, the empty cavity of the speaker is required to be as small as possible to save space, which requires a cavity filling material with higher frequency reduction performance.

The amount and speed of gas molecules adsorbed by the sound-absorbing particles filled in the rear cavity of the speaker are the key determining the frequency reduction effect thereof. Therefore, it is necessary to provide a new sound-absorbing particle and a preparation method thereof and a speaker. The sound-absorbing particle has a larger effective surface area and a shorter gas adsorption and desorption path, which can make the speaker have better acoustic effects.

SUMMARY

The purpose of the present disclosure is to provide a sound-absorbing particle with a larger effective surface area and a shorter gas adsorption and desorption path, so that the acoustic performance of the speaker is better.

In order to achieve the above purpose, in a first aspect, the present disclosure provides a sound-absorbing particle, formed by combing a molecular sieve and an adhesive, and including a first flat surface and a second flat surface symmetrically distributed to each other, and an annular arc-shaped side edge connecting the first flat surface and the second flat surface. A ratio of the molecular sieve and the adhesive by weight is 1:0.02-0.1.

As an improvement, the molecular sieve has one or more of an MFI structure, a FER structure and a MEL structure.

As an improvement, the molecular sieve is composed of silicon oxide and a metal element.

As an improvement, the metal element includes one or more of aluminum, iron, zinc and zirconium.

As an improvement, a molar ratio of a silicon element in the silicon oxide to the metal element is greater than or equal to 100.

As an improvement, a distance between the first flat surface and the second flat surface is defined as a thickness of the sound-absorbing particle, a length of the sound-absorbing particle is defined by a long axis of the arc-shaped side edge, and the thickness of the sound-absorbing particle is 20% to 80% of the length of the sound-absorbing particle.

As an improvement, the arc-shaped side edge is circular or elliptical.

In a second aspect, the present disclosure provides a method for preparing sound-absorbing particles, for preparing the sound-absorbing particles as described in the above embodiments. The preparation method includes the following steps: adding a powder of the molecular sieve into water and stirring evenly, and adding the adhesive and stirring to obtain a precursor slurry; extracting a preset dose of oils, using the precursor slurry as a dispersed phase, the oils as a continuous phase, feeding the dispersed phase and the continuous phase into a microfluidic device and dispersing into emulsion droplets by a microfluidic method; flowing the emulsion droplets into a microchannel of a predetermined shape, and performing squeeze to form drum-shaped emulsion droplets; subjecting the drum-shaped emulsion droplets to liquid nitrogen cold solidification treatment to obtain solidified particles; and removing ice from the solidified particles by sublimation to obtain the sound-absorbing particles.

As an improvement, a ratio of a molecular sieve, an adhesive and water in the precursor slurry by weight is 1:0.02-0.1:0.5-2.

As an improvement, a solidification point of the oils is lower than a solidification point of the precursor slurry.

As an improvement, the oils include unsaturated fatty acid or anti-freezing agent.

As an improvement, an emulsification device of the microfluidic device includes a T-shaped vertically staggered microchannel and a fluid focusing microchannel.

As an improvement, the microchannel includes a tubular front section and a flat rear section, and the dispersed phase and the continuous phase enter the microchannel from the tubular front section.

As an improvement, a diameter of the dispersed phase is greater than a height of the flat rear section of the microchannel, and the flat rear section of the microchannel is configured to squeeze the emulsion droplets into a drum shape.

As an improvement, a temperature in the flat rear section of the microchannel is higher than a solidification point of the continuous phase and lower than a solidification point of the dispersed phase.

In a third aspect, the present disclosure provides a speaker, including a housing with a receiving space, a sound-producing unit arranged in the housing, and a rear cavity surrounded by the sound-producing unit and the housing. The rear cavity is filled with the sound-absorbing particles as described in the above embodiments.

Compared with the related art, the sound-absorbing particle according to the present disclosure has a smaller longitudinal size under the same volume, the path of gas entering the interior of the sound-absorbing particle is shorter, and more gas molecules can be adsorbed or desorbed in a short time, thus making the sound-absorbing particle has better sound-absorbing effect, and filling the rear cavity of the speaker with the sound-absorbing particles can significantly improve the acoustic performance of the speaker.

BRIEF DESCRIPTION OF DRAWINGS

In order to better describe the technical solutions in the embodiments of the present disclosure, the drawings which are needed in the description of the embodiments will be briefly introduced as follows. It is appreciated that, the drawings in the following description are only some of the embodiments of the present disclosure, and for those of ordinarily skilled in the art, other drawings can also be obtained in accordance with these drawings without any creative effort.

DESCRIPTION OF EMBODIMENTS

The technical solutions of the embodiments of the present disclosure will be clearly and completely described in conjunction with the drawings hereinafter. It is appreciated that, the described embodiments are only part of the embodiments of the present disclosure, not all of the embodiments. According to the embodiments of the present disclosure, all other embodiments obtained by those of ordinarily skilled in the art without creative effort are within the protection scope of the present disclosure.

Figure 1:
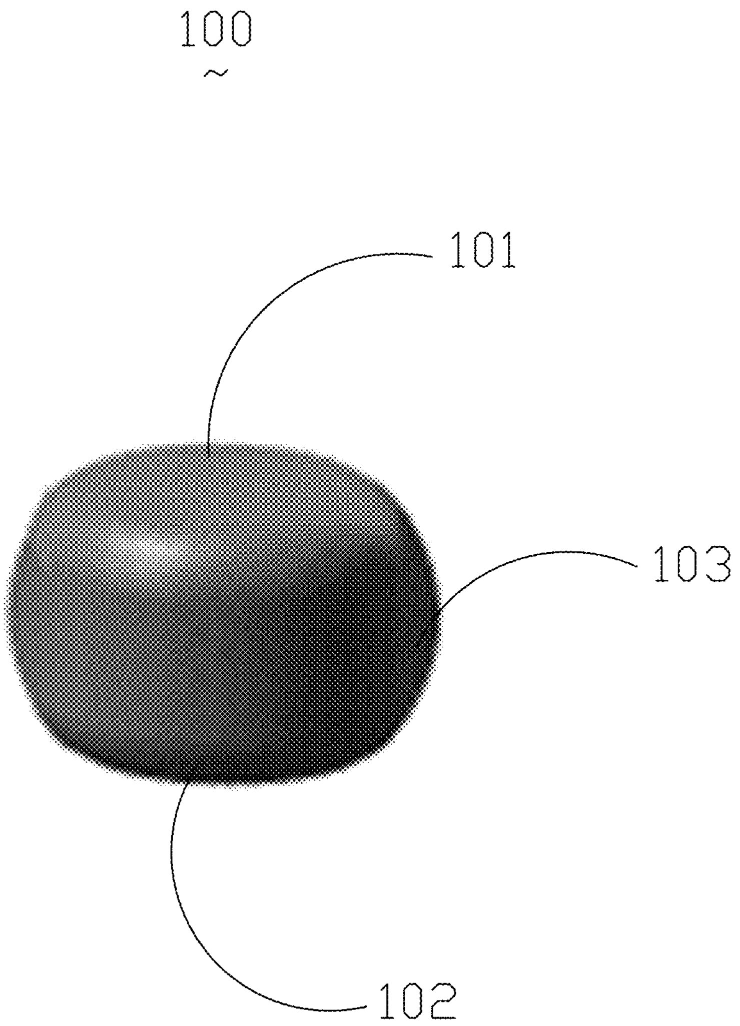
FIG. 1 is a solid structural schematic diagram of a sound-absorbing particle according to an embodiment of the present disclosure.

As shown in FIG. 1, FIG. 1 is a solid structural schematic diagram of a sound-absorbing particle 100 according to an embodiment of the present disclosure. In a first aspect, the present disclosure provides a sound-absorbing particle 100, formed by combing a molecular sieve and an adhesive, and including a first flat surface 101 and a second flat surface 102 symmetrically distributed to each other, and an annular arc-shaped side edge 103 connecting the first flat surface 101 and the second flat surface 102. In an embodiment, a ratio of the molecular sieve and the adhesive by weight is 1:0.02-0.1.

In an embodiment, the molecular sieve has one or more of an MFI structure, a FER structure and a MEL structure.

In an embodiment, the molecular sieve is composed of silicon oxide and a metal element.

In an embodiment, the metal element includes one or more of aluminum, iron, zinc and zirconium.

In an embodiment, a molar ratio of a silicon element in the silicon oxide to the metal element is greater than or equal to 100.

Figure 2:
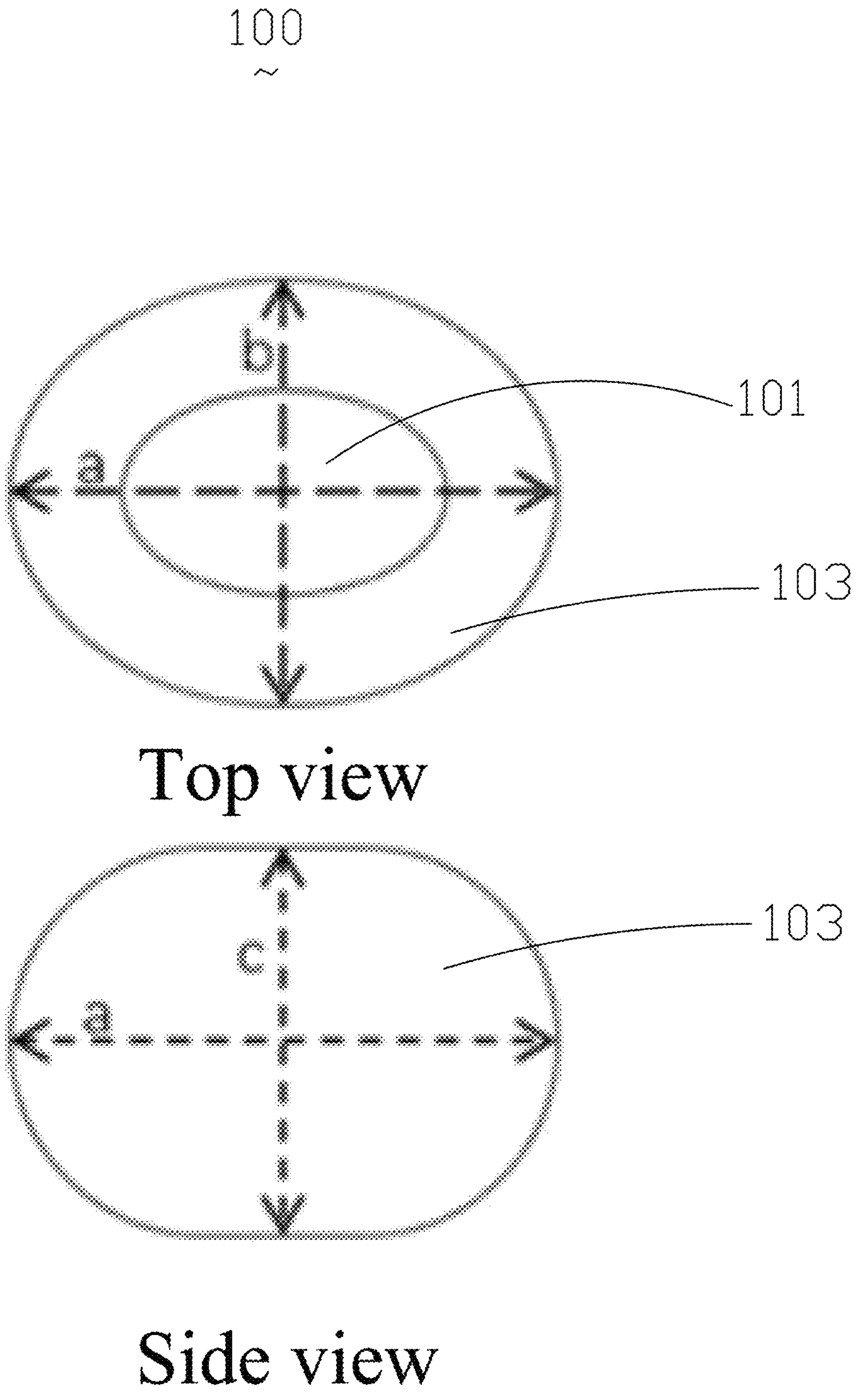
FIG. 2 is a schematic diagram of a top/bottom view and a side view of a sound-absorbing particle according to an embodiment of the present disclosure.

In an embodiment, as shown in FIG. 2, FIG. 2 is a schematic diagram of a top/bottom view and a side view of a sound-absorbing particle according to an embodiment of the present disclosure. In FIG. 2, a represents a long axis of the arc-shaped side edge 103, b represents the short axis of the arc-shaped side edge 103, and c represents a distance between the first flat surface 101 and the second flat surface 102. The distance c between the first flat surface 101 and the second flat surface 102 is defined as a thickness of the sound-absorbing particle 100, a length of the sound-absorbing particle 100 is defined by a long axis a of the arc-shaped side edge 103, and the thickness c of the sound-absorbing particle 100 is 20% to 80% of the length a of the sound-absorbing particle 100.

In an embodiment, the arc-shaped side edge 103 is circular or elliptical.

The distance c between the first flat surface 101 and the second flat surface 102 of the sound-absorbing particle 100 according to the present disclosure is 20% to 80% of the diameter or long axis of the observed circular or elliptical shape. Compared with the existing spherical sound-absorbing particles, the sound-absorbing particle 100 according to the present disclosure has a smaller longitudinal distance, the path of gas molecules entering the interior of the particle from the top or bottom is shorter, resulting in a faster desorption and absorption rate, in so that the speaker has a better frequency reduction effect.

Figure 3:
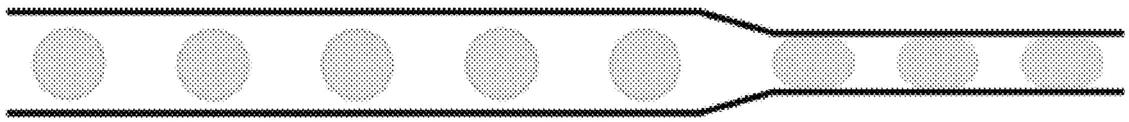
FIG. 3 is a schematic diagram of a front/rear deformation of emulsion droplets in a microchannel of a microfluidic device when the emulsion droplets enters a flat rear section from a tubular front section according to an embodiment of the present disclosure.

In a second aspect, as shown in FIG. 3, FIG. 3 is a schematic diagram of a front/rear deformation of emulsion droplets in a microchannel of a microfluidic device according to an embodiment of the present disclosure when the emulsion droplets enters a flat rear section from a tubular front section.

The present disclosure further provides a method for preparing sound-absorbing particles, for preparing the sound-absorbing particles 100 as described in the above embodiments. The preparation method includes the following steps: a powder of the molecular sieve is added into water and stirred evenly, and the adhesive is added and stirred to obtain a precursor slurry; a preset dose of oils is extracted, the precursor slurry is used as a dispersed phase, the oils is used as a continuous phase, the dispersed phase and the continuous phase are inputted into a microfluidic device and dispersed into emulsion droplets by a microfluidic method; the emulsion droplets are flowed into a microchannel of a predetermined shape, and squeeze is performed to form drum-shaped emulsion droplets; the drum-shaped emulsion droplets are subjected to liquid nitrogen cold solidification treatment to obtain solidified particles; and ice is removed from the solidified particles by sublimation to obtain the sound-absorbing particles.

In this embodiment, a ratio of a molecular sieve, an adhesive and water in the precursor slurry by weight is 1:0.02-0.1:0.5-2. As an improvement, the ratio of a molecular sieve, an adhesive and water in the precursor slurry by weight is 1:0.05-0.1:0.8-1.5.

In this embodiment, a solidification point of the oils is lower than a solidification point of the precursor slurry.

In this embodiment, the oils include unsaturated fatty acid or anti-freezing agent.

In this embodiment, an emulsification device of the microfluidic device includes a T-shaped vertically staggered microchannel and a fluid focusing microchannel.

In this embodiment, the microchannel includes a tubular front section and a flat rear section, and the dispersed phase and the continuous phase enter the microchannel from the tubular front section.

In this embodiment, a diameter of the dispersed phase is greater than a height of the flat rear section of the microchannel, and the flat rear section of the microchannel is configured to squeeze the emulsion droplets into a drum shape.

In this embodiment, a temperature in the flat rear section of the microchannel is higher than a solidification point of the continuous phase and lower than a solidification point of the dispersed phase.

In order to describe the technical features and technical solutions of the present disclosure in detail, the present disclosure is described herein with a specific preparation method, but the implementation method should not be understood as limiting the implementation scope of the present disclosure.

Figure 4:
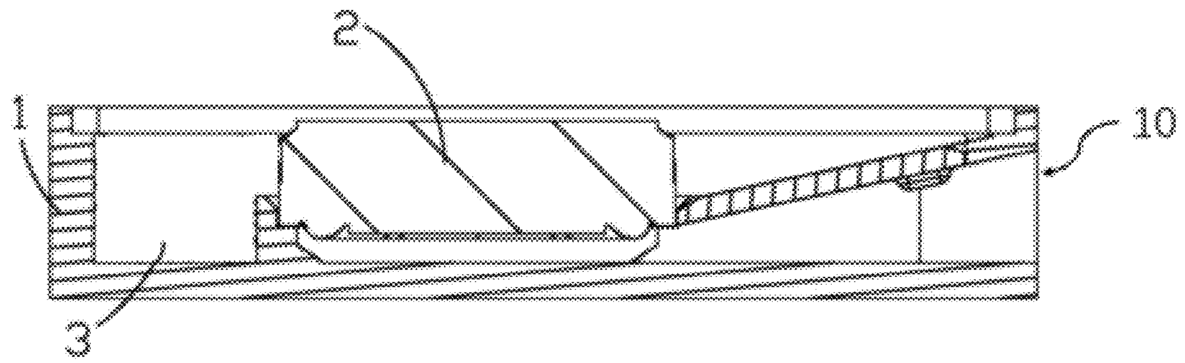
FIG. 4 is a schematic diagram of a speaker according to an embodiment of the present disclosure.

In a third aspect, the present disclosure provides a speaker 10, as shown in FIG. 4, including a housing 1 with a receiving space, a sound-producing unit 2 arranged in the housing 1, and a rear cavity 3 surrounded by the sound-producing unit 2 and the housing 1. The rear cavity 3 is filled with sound-absorbing particles 100 as described in the above embodiments to increase the acoustic compliance of the air in the rear cavity 3, thereby improving the low-frequency performance of the speaker 10.

Example 1

In this example, the sound-absorbing particles are prepared according to the following steps.

(I) 5 g of the molecular sieve powder was weighed and added to 5 g of deionized water and stirred evenly, and 1 g of acrylic adhesive with a solid content of 50% was further added and continued to be stirred to obtain a precursor slurry.

(II) 15 mL of micro droplet reaction oil was measured, and 5 mL of linoleic acid was added and mixed evenly to obtain a continuous phase oil.

(III) The precursor slurry in step (I) was added to a water phase reservoir of a particle preparation instrument, and the oil in step (II) was added to an oil phase reservoir of the particle preparation instrument.

(IV) The temperature of the flat rear section of the microchannel was set to −8° C., the flow rates of channel 1 (water phase/dispersed phase) and channel 2 (oil phase/continuous phase) were set to 5 μL/min and 20 μL/min, respectively, and sample preparation was started.

(V) The solidified drum-shaped particles (i.e. solidified particles) were collected using a cryogenic container.

(VI) The solidified particles obtained in step (V) were placed in a low-pressure vacuum environment, and after all ice in the solidified particles was removed through sublimation, the solidified particles were placed in an oven and dried at 120° C. for 2 hours to obtain sound-absorbing particles.

Comparative Example 1

(I) 5 g of the molecular sieve powder was weighed and added to 5 g of deionized water and stirred evenly, and 1 g of acrylic adhesive with a solid content of 50% was added and continued to be stirred to obtain a molecular sieve slurry.

(II) The molecular sieve slurry was loaded into a spray dryer and spray-dried to obtain molecular sieve particles.

(III) The molecular sieve particles obtained in step (II) were placed in an oven and dried at 120° C. for 1 hour to obtain spray-dried spherical sound-absorbing particles.

Comparative Example 2

(I) 5 g of the molecular sieve powder was weighed and added to 5 g of deionized water and stirred evenly, and 1 g of acrylic adhesive with a solid content of 50% was added and continued to be stirred to obtain a molecular sieve slurry.

(II) The molecular sieve slurry was sprayed in a cooling tower to form solid particles.

(III) The solid particles in step (II) were collected and placed in a low-pressure vacuum environment, and after all ice in the particles was removed through sublimation, the particles were placed in an oven and dried at 120° C. for 2 hours to obtain spherical sound-absorbing particles.

Comparative Example 3

In this comparative example, spherical sound-absorbing particles were prepared by a microfluidic system of a conventional microchannel. The preparation method thereof is different from that of Example 1 in that the microfluidic channel of the microfluidic system does not have a low-temperature flat rear section. After the molecular sieve emulsion droplets of the dispersed phase flowed out of the cylindrical microfluidic channel and were collected together with the continuous phase through a normal temperature container, and then cooled and solidified. The collected particles were placed in a low-pressure vacuum environment, and after all ice in the particles was removed through sublimation, the particles were placed in an oven and dried at 120° C. for 2 hours to obtain spherical sound-absorbing particles prepared by the existing microfluidic method.

Acoustic Measurement

A resonant frequency of the speaker is determined by measuring a frequency-dependent resistance and a phase thereof, as well as the corresponding zero-crossing point. A speaker with a 0.5 ml rear cavity and a 11 mm*15 mm*3 mm sound-producing unit was connected to an impedance analyzer, particles with a diameter of 300~350 μm were screened and filled in the rear cavity of the speaker, and compared with the empty cavity to calculated an offset value of F0, i.e., ΔF0.

The acoustic measurement results of the Example and Comparative Examples are as follows:

| Sample | Particle size (μm) | $F_0$ (Hz) of empty cavity | $F_0$ (Hz) after filing the sample | $\Delta F_0$ (Hz) | Shape |
|---|---|---|---|---|---|
| Example1 | 280-355 | 982 | 740 | 242 | Drum |
| Comparative Example 1 | 200-450 | 981 | 785 | 196 | Sphere |
| Comparative Example 2 | 200-450 | 981 | 762 | 219 | Sphere |
| Comparative Example 3 | 250-280 | 982 | 761 | 221 | Sphere |

The particle size distribution, acoustic performance and particle shape of the samples from different examples in the above table show that the sound-absorbing particles according to the present disclosure have the highest ΔF0, so that the speaker has a better frequency reduction effect.

Compared with the sound-absorbing particles prepared by the spray method, the sound-absorbing particles prepared by the microfluidics method have a smaller particle size distribution.

For the above example, the selected particle size is within the commonly used size range with good sound absorption effect. By changing the injection speed, pipeline size, etc. of the microfluidic device, the size and structure of the drum-shaped sound-absorbing particles in the example can be adjusted as needed within a certain size range.

The above description is only implementations of the present disclosure. It should be pointed out that, for those skilled in the art, improvements can be made without departing from the inventive concept of the present disclosure, but all of them fall within the protection scope of the present disclosure.

What is claimed is:

1. A sound-absorbing particle, formed by combing a molecular sieve and an adhesive, and comprising a first flat surface and a second flat surface symmetrically distributed to each other, and an annular arc-shaped side edge connecting the first flat surface and the second flat surface;

wherein a ratio of the molecular sieve and the adhesive by weight is 1:(0.02 to 0.1).

2. The sound-absorbing particle as described in claim 1, wherein the molecular sieve has one or more of an MFI structure, an FER structure and a MEL structure.

3. The sound-absorbing particle as described in claim 1, wherein the molecular sieve is composed of silicon oxide and a metal element.

4. The sound-absorbing particle as described in claim 3, wherein the metal element comprises one or more of aluminum, iron, zinc and zirconium.

5. The sound-absorbing particle as described in claim 4, wherein a molar ratio of a silicon element in the silicon oxide to the metal element is greater than or equal to 100.

6. The sound-absorbing particle as described in claim 1, wherein the sound-absorbing particle has a thickness defined by a distance between the first flat surface and the second flat surface, the sound-absorbing particle has a length defined by a long axis of the arc-shaped side edge, and the thickness of the sound-absorbing particle is 20% to 80% of the length of the sound-absorbing particle.

7. The sound-absorbing particle as described in claim 1, wherein the arc-shaped side edge is circular or elliptical.

8. A method for preparing a sound-absorbing particle as described in claim 1, comprising:

adding a molecular sieve powder into water and stirring evenly, and adding the adhesive and stirring to obtain a precursor slurry;

taking a preset dose of oils as a continuous phase, and the precursor slurry as a dispersed phase, feeding the dispersed phase and the continuous phase into a microfluidic device and dispersing into emulsion droplets by a microfluidic method;

flowing the emulsion droplets into a microchannel with a predetermined shape for squeezing to form drum-shaped emulsion droplets;

performing liquid nitrogen cold solidification treatment on the drum-shaped emulsion droplets to obtain solidified particles; and removing ice from the solidified particles by sublimation to obtain the sound-absorbing particle.

9. The method as described in claim 8, wherein a proportion of a molecular sieve, an adhesive and water in the precursor slurry by weight is 1:(0.02 to 0.1):(0.5 to 2).

10. The method as described in claim 9, wherein a solidification point of the oils is lower than a solidification point of the precursor slurry.

11. The method as described in claim 10, wherein the oils comprise unsaturated fatty acid or anti-freezing agent.

12. The method as described in claim 8, wherein an emulsification device of the microfluidic device comprises a T-shaped vertically staggered microchannel and a fluid focusing microchannel.

13. The method as described in claim 10, wherein the microchannel comprises a tubular front section and a flat rear section, and the dispersed phase and the continuous phase enter the microchannel from the tubular front section.

14. The method as described in claim 13, wherein a diameter of the dispersed phase is greater than a height of the flat rear section of the microchannel, and the flat rear section of the microchannel is configured to squeeze the emulsion droplets to have a drum shape.

15. The method as described in claim 14, wherein a temperature of the flat rear section of the microchannel is higher than a solidification point of the continuous phase and lower than a solidification point of the dispersed phase.

16. A speaker, comprising a housing with a receiving space, a sound-producing unit arranged in the housing, and a rear cavity surrounded by the sound-producing unit and the housing, wherein the rear cavity is filled with the sound-absorbing particles as described in claim 1.

* * * * *